US011835922B2

United States Patent
Muravev et al.

(10) Patent No.: US 11,835,922 B2
(45) Date of Patent: Dec. 5, 2023

(54) AUGMENTED REALITY DEVICE BASED ON WAVEGUIDE WITH HOLOGRAPHIC DIFFRACTIVE GRATING STRUCTURE AND APPARATUS FOR RECORDING THE HOLOGRAPHIC DIFFRACTIVE GRATING STRUCTURE

(71) Applicant: SAMSUNG ELECTRONICS CO., LTD., Suwon-si (KR)

(72) Inventors: Nikolay Victorovich Muravev, Podolsk (RU); Vladimir Nikolaevich Borisov, Saint Petersburg (RU); Mikhail Vyacheslavovich Popov, Krasnogorsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 17/411,916

(22) Filed: Aug. 25, 2021

(65) Prior Publication Data

US 2022/0066389 A1    Mar. 3, 2022

(30) Foreign Application Priority Data

Aug. 25, 2020  (RU) ........................... RU2020128284
Jun. 3, 2021   (KR) ........................ 10-2021-0072323

(51) Int. Cl.
*G03H 1/04*    (2006.01)
*G02B 27/01*   (2006.01)

(52) U.S. Cl.
CPC ....... *G03H 1/0402* (2013.01); *G02B 27/0172* (2013.01); *G02B 2027/0174* (2013.01); *G03H 2001/0441* (2013.01); *G03H 2223/18* (2013.01)

(58) Field of Classification Search
None
See application file for complete search history.

(56) References Cited

U.S. PATENT DOCUMENTS 5,640,257 A    6/1997  Clube
7,618,750 B2   11/2009 Ueda et al.
(Continued)

FOREIGN PATENT DOCUMENTS

CN    101004641 A    7/2007
CN    100381984 C    4/2008
(Continued)

OTHER PUBLICATIONS

Search Report and Written Opinion (PCT/ISA/210 & PCT/ISA/237) dated Nov. 30, 2021 by the International Searching Authority in International Application No. PCT/KR2021/011225.
(Continued)

*Primary Examiner* — Jennifer D. Carruth
(74) *Attorney, Agent, or Firm* — Sughrue Mion, PLLC

(57) ABSTRACT

Provided is an augmented reality (AR) device based on a waveguide with a holographic diffractive grating structure and an apparatus for recording the holographic diffractive grating structure. The apparatus includes a light source, a beam splitter, a first amplitude filter and a first triangular prism that are arranged on a path of a first light beam, and a second amplitude filter and a second triangular prism that are arranged on a path of a second light beam, in which a first part of the first light beam passes through the first triangular prism without attenuation, a second part of the first light beam passes through the first triangular prism after being attenuated, and the second light beam passes through the second triangular prism after being attenuated, and the holographic diffractive grating structure is recorded between the first triangular prism and the second triangular prism.

21 Claims, 14 Drawing Sheets

(56) References Cited

U.S. PATENT DOCUMENTS

| | | |
|---|---|---|
| 9,581,814 B2 | 2/2017 | Nowatzyk |
| 10,215,983 B2 | 2/2019 | Gao et al. |
| 10,585,290 B2 | 3/2020 | Cai et al. |
| 11,036,109 B2 | 6/2021 | Oh |
| 2001/0017697 A1 | 8/2001 | Kanda et al. |
| 2006/0126182 A1 | 6/2006 | Levola |
| 2008/0002212 A1 | 1/2008 | Kawasaki et al. |
| 2018/0239147 A1 | 8/2018 | Schowengerdt et al. |
| 2018/0284460 A1 | 10/2018 | Cheng et al. |
| 2019/0004321 A1 | 1/2019 | Grey et al. |
| 2019/0056593 A1 | 2/2019 | Bablumyan |
| 2019/0171007 A1 | 6/2019 | Gao et al. |
| 2019/0204780 A1 | 7/2019 | Zhang et al. |
| 2022/0187765 A1* | 6/2022 | Bablumyan .......... G03H 1/0465 |
| 2023/0088953 A1* | 3/2023 | Smeeton ............ G02B 27/0081 359/13 |

FOREIGN PATENT DOCUMENTS

| | | |
|---|---|---|
| CN | 104076620 A | 10/2014 |
| CN | 105934902 A | 9/2016 |
| CN | 106662754 A | 5/2017 |
| CN | 104054027 B | 8/2017 |
| CN | 109116577 A | 1/2019 |
| CN | 109239920 A | 1/2019 |
| CN | 110488490 A | 11/2019 |
| CN | 110546549 A | 12/2019 |
| CN | 210136366 U | 3/2020 |
| EP | 3 855 221 A1 | 7/2021 |
| KR | 10-2007-0066375 A | 6/2007 |
| RU | 2 199 769 C2 | 2/2003 |
| RU | 2 719 568 C1 | 4/2020 |
| WO | 2013/109435 A1 | 7/2013 |
| WO | 2015/081313 A2 | 6/2015 |
| WO | 2015/081313 A9 | 6/2015 |
| WO | 2018/031634 A1 | 2/2018 |
| WO | 2018/156779 A1 | 8/2018 |
| WO | 2018/175653 A1 | 9/2018 |
| WO | 2018/224847 A2 | 12/2018 |
| WO | 2019/135165 A2 | 7/2019 |

OTHER PUBLICATIONS

"Microsoft HoloLens", Wikipedia, Aug. 6, 2021 (last edited), https://en.wikipedia.org/wiki/Microsoft_HoloLens, 8 pages total.

"HoloLens 2", Microsoft, copyright 2021, https://www.microsoft.com/en-us/hololens/hardware, 6 pages total.

"HoloLens 2", Wikipedia, Aug. 16, 2021 (last edited), https://en.wikipedia.org/wiki/HoloLens_2, 3 pages total.

Communication dated Feb. 19, 2021 issued by the Russian Intellectual Property Office in counterpart Russian Application No. 2020128284.

Search Report dated Jan. 28, 2021 issued by the Russian Intellectual Property Office in counterpart Russian Application No. 2020128284.

* cited by examiner

AUGMENTED REALITY DEVICE BASED ON WAVEGUIDE WITH HOLOGRAPHIC DIFFRACTIVE GRATING STRUCTURE AND APPARATUS FOR RECORDING THE HOLOGRAPHIC DIFFRACTIVE GRATING STRUCTURE

CROSS-REFERENCE TO RELATED APPLICATIONS

This application is based on and claims priority under 35 U.S.C. § 119 to Russian Patent Application No. 2020128284, filed on Aug. 25, 2020, in the Federal Service for Intellectual Property of Russia, and to Korean Patent Application No. 10-2021-0072323, filed on Jun. 3, 2021, in the Korean Intellectual Property Office, the disclosures of which are incorporated herein by reference in their entireties.

BACKGROUND

1. Field

The disclosure relates to an augmented reality (AR) device based on a waveguide with a holographic diffractive grating structure and an apparatus for recording the holographic diffractive grating structure.

2. Description of Related Art

An augmented reality (AR) device such as AR glasses is a wearable personal device. AR devices may be used as, for example, additional screens for smart phones or other electronic devices, or may substitute for user's televisions (TVs) or smart phones.

AR devices may require a wide field of view which may cover the entire area human eyes see and superimpose virtual images over a large area, high-quality image, light weight, compactness, low cost, high resolution, high contrast, etc.

To achieve such requirements, there may be related problems. For example, the wide field of view needs to provide a wide area within which the eye may see the entire image completely, without loss. There are various approaches to achieve these requirements. One of them may provide the wide field of view, failing to provide a wide area within which a user's eye may see the entire image completely, without loss. Another approach may not provide the wide field of view, although providing the wide area within which the user's eye may see the entire image completely, without loss. A related AR device that does not use exit pupil expanding has an in-coupling grating and an out-coupling grating. The in-coupling grating and the out-coupling grating are formed with a holographic optical element (HOE) or a diffractive optical element (DOE). Such a related AR device schematically functions as below. A projector forms an image at infinity, by forming parallel beams. The in-coupling grating provided on a waveguide is placed in an exit pupil of the projector. Parallel beams are input to the waveguide without breaking their parallelism due to the in-coupling grating (HOE/DOE), and the beams propagate in the waveguide and are incident on or arrive at the out-coupling diffractive grating (HOE/DOE) through total internal reflection. In a related art, only one order of diffracted light of light diffracted in the diffractive grating is used, and the in-coupling and out-coupling diffractive gratings are used only in one plane, such that even a wide input field turns, at an output stage, into a narrow picture, which may be uncomfortable to view for a viewer. When an eye pupil looks forward, only the central field of an image is clearly visible because parts of the image located at edges represent a dark area, whereas when the eye pupil moves vertically, conversely, the central field may appear as a dark area. That is, in a related AR device, the user may see only an image such as a narrow strip.

In a related AR device, to increase the field of view, the size and weight of the system may increase.

A related AR device may include a waveguide, an image input element, an expanding element, and an image output element. The presence of the expanding element increases the weight and the dimensions of the device. The expanding element does not operate to form an image, but improves the quality of the image and increases an eye motion box. To increase the field of view, a related AR device uses a complex waveguide structure containing 3 or more diffraction elements. A relief phase diffraction element appropriate for use in the related AR device requires a complex manufacturing process which has a high rejection rate, increasing a price of the final product. Moreover, several separate elements for inputting the light, expanding the exit pupil, and outputting the light need to be used, such that the device is significantly bulky and heavy.

A problem in using the holographic optical element (HOE) is the low diffraction efficiency of recording materials such as photopolymer. These materials do not sufficiently have a refractive index n and a refractive index change Δn, thus failing to provide a high diffraction efficiency and thus to provide wide angular selectivity and good image uniformity in a thin layer to secure the wide field of view. As known from a related art, the greater the refractive index n of the material is, with the larger angular field the light may pass through the waveguide. The periodic refractive index change Δn creates a diffractive grating. For relief-phase diffractive gratings, the refractive index change Δn is considered as a refractive index difference between a material and the air, and is greater than or equal to 0.3. For the HOE, Δn is provided by the mass transfer of a material with a higher refractive index inside the material (in the thickness direction), and thus is several times lower than Δn of the DOE. The value Δn determines the maximum diffraction efficiency in a fixed thickness of the material, and the larger the value Δn is, the greater the diffraction efficiency is. Theoretically, high diffraction efficiency may be obtained with a thick layer of the material and a relatively low Δn, however, the thick layer worsens the angular selectivity of the grating and, accordingly, decreases the field of view. Thus, an ideal material for the HOE is a material of a thin thickness (0.5-2 μm) with a high refractive index n and a high value Δn. However, such materials do not exist today.

Therefore, in a related art, increasing the number of diffractive gratings may increase the size of the waveguide or increase the number of waveguides.

It is necessary to prevent all beams input to the waveguide from moving beyond boundaries because of using total internal reflection. However, due to a limitation in the refractive index of a medium, an internal reflection angle is limited, which limits the field of view, and thus, an indicator such as the angular selectivity of diffraction elements is important.

SUMMARY

Provided is an apparatus and method for recording a holographic diffractive grating structure capable of providing a wide field of view.

Also provided is a waveguide with a holographic diffractive grating structure capable of providing a wide field of view.

Moreover, provided is an augmented reality (AR) device that displays AR with a wide field of view while minimizing light loss.

In addition, provided is an AR device that is easy to manufacture and is compact and lightweight.

Technical problems to be solved are not limited to the technical problems described above, and other technical problems may exist.

Additional aspects will be set forth in part in the description which follows and, in part, will be apparent from the description, or may be learned by practice of the presented embodiments of the disclosure.

In accordance with an aspect of the disclosure, there is provided an apparatus for recording a holographic diffractive grating structure, the apparatus including a light source configured to output light, a beam splitter configured to split the light output from the light source into a first light beam and a second light beam, a first amplitude filter and a first triangular prism that are provided on a path of the first light beam, and a second amplitude filter and a second triangular prism that are provided on a path of the second light beam, wherein the first amplitude filter is provided such that a first part of the first light beam is directed to the first triangular prism without passing through the first amplitude filter and a second part of the first light beam, which is different from the first part, is directed to the first triangular prism after being attenuated by passing through the first amplitude filter, wherein the first triangular prism is provided such that the first part of the first light beam is incident on a first surface of the first triangular prism, which corresponds to one of equal sides of an isosceles triangle, and exits through a first exit surface of the first triangular prism, which corresponds to a base of the isosceles triangle, and the second part of the first light beam is incident on a second surface of the first triangular prism, which corresponds to the other side of the equal sides of the isosceles triangle, and exits through the first exit surface, wherein the second triangular prism is provided such that the second light beam is attenuated by passing through the second amplitude filter, is incident on a first surface of the second triangular prism, and exits through a second exit surface of the second triangular prism, the second exit surface of the second triangular prism being separated from and parallel to the first exit surface of the first triangular prism, and wherein a diffractive grating material for recording the holographic diffractive grating structure is provided between the first exit surface of the first triangular prism and the second exit surface of the second triangular prism.

An incident angle at which the first part of the first light beam is incident on the first surface of the first triangular prism and an incident angle at which the second part of the first light beam is incident on the second surface of the first triangular prism may be equal.

The apparatus may further include at least one of a first light beam expander provided on a path of the first light beam between the beam splitter and the first amplitude filter, the first light expander being configured to expand a beam width of the first light beam and a second light beam expander provided on a path of the second light beam between the beam splitter and the second amplitude filter, the second light beam expander being configured to expand a beam width of the second light beam.

The apparatus may further include at least one of a first light path conversion member provided on a path of the first light beam between the beam splitter and the first triangular prism, the first light path conversion member being configured to convert the path of the first light beam and a second light conversion member provided on a path of the second light beam between the beam splitter and the second triangular prism, the second light path conversion member being configured to convert the path of the second light beam.

The light source may include a coherent light source.

The apparatus may further include a first shutter provided behind the first amplitude filter, and a second shutter provided behind the second amplitude filter.

The apparatus may further include a rotation table that is provided between the first exit surface of the first triangular prism and the second exit surface of the second triangular prism that is parallel to the first exit surface of the first triangular prism, the rotation table may include a top surface on which the diffractive grating material for recording the holographic diffractive grating structure is provided.

In accordance with an aspect of the disclosure, there is provided a method of recording a holographic grating structure by an apparatus configured to record the holographic diffractive grating structure of claim 1, the method including generating light by a light source, splitting the light into a first light beam and a second light beam by a beam splitter, directing a first part of the first light beam to a first surface of a first triangular prism, which corresponds to one of equal sides of an isosceles triangle, without passing through the first amplitude filter, attenuating a second part of the first light beam, which is different from the first part, by the first amplitude filter, and directing the second part to a second surface of the first triangular prism, which corresponds to the other of the equal sides of the isosceles triangle, directing the first part of the first light beam and the second part of the first light beam to be incident on the first surface and the second surface of the first triangular prism, refracting the first part and the second part, and directing the first part and the second part to exit from a first exit surface of the first triangular prism, which corresponds to a base of the isosceles triangle, attenuating the second light beam by the second amplitude filter, directing the second light beam to be incident on a first surface of the second triangular prism, refracting the second light beam, and directing the second light beam to exit through a second exit surface of the second triangular prism, providing a diffractive grating material for recording the holographic diffractive grating structure between the first exit surface of the first triangular prism and the second exit surface of the second triangular prism, forming an interference pattern by the first part of the first light beam and the second part of the first light beam based on the first part of the first light beam and the second part of the first light beam being incident on the diffractive grating material through the first exit surface of the first triangular prism and recording a first diffractive grating in the diffractive grating material, and forming an interference pattern by the first part of the first light beam and the second light beam based on the second light beam being incident on the diffractive grating material through the second exit surface of the second triangular prism and recording a second diffractive grating in the diffractive grating material.

An incident angle at which the first part of the first light beam is incident on the first surface of the first triangular prism and an incident angle at which the second part of the first light beam is incident on the second surface of the first triangular prism may be equal, such that a maximum intensity and a minimum intensity of the interference pattern by the first part of the first light beam and the second part of the first light beam are formed vertically in a depth direction on a first surface of the diffractive grating material.

The maximum intensity and the minimum intensity of the interference pattern by the first part of the first light beam and the second part of the first light beam may be formed at an angle to a second surface of the diffractive grating material, which opposes the first surface of the diffractive grating material.

The first refractive grating may include an expanded diffractive grating, and the second refractive grating may include an out-coupling diffractive grating.

A surface period of the first diffractive grating and a surface period of the second diffractive grating may be equal.

A recording depth of the first diffractive grating and a recording depth of the second diffractive grating may correspond to a selection of transmittance of the first amplitude filter and a selection of transmittance the second amplitude filter, respectively.

A recording depth of the first diffractive grating and a recording depth the second diffractive grating may correspond to selection of an exposure time.

The method may further include providing the diffractive grating material on a rotation table, wherein the recording of the first diffractive grating and the recording of the second diffractive grating may include rotating a rotation table in which the diffractive grating material is placed by an angle of +α, and recording a first diffractive grating structure on the diffractive grating material, and rotating the rotation table by an angle of −α, and recording a second diffractive grating structure on the diffractive grating material, wherein the first diffractive grating structure includes a first expanding diffractive grating and a first out-coupling diffractive grating that are recorded to a certain thickness from a top surface and a bottom surface of the diffractive grating material, respectively, and wherein the second diffractive grating structure is formed between the first expanding diffractive grating and the first out-coupling diffractive grating.

The diffractive grating material may include a first layer and a second layer on a surface of the waveguide, wherein the first diffractive grating structure and the second diffractive grating structure may be formed on the first layer and the second layer of the diffractive grating material, respectively, and wherein each of the first diffractive grating structure and the second diffractive grating structure may include the first diffractive grating and the second diffractive grating.

The method may further include rotating the first diffractive grating structure and the second diffractive grating structure at symmetric angles with respect to a vector of the input diffractive element.

The diffractive grating material may include a first layer and a second layer provided on a top surface and a bottom surface of the waveguide, respectively, the top surface and the bottom surface opposing each other, wherein the first diffractive grating structure and the second diffractive grating structure may be formed on the first layer and the second layer of the diffractive grating material, respectively, and wherein each of the first diffractive grating structure and the second diffractive grating structure may include the first diffractive grating and the second diffractive grating.

In accordance with an aspect of the disclosure, there is provided an augmented reality (AR) device for displaying AR, the AR device including a projection system, an input diffractive element, and a waveguide including a holographic diffractive grating structure that includes an expanded diffractive structure and an out-coupling diffractive grating, wherein the expanded diffractive grating has a shape of a first interference pattern formed in a depth direction on a first surface of a diffractive grating material applied to the waveguide, wherein the out-coupling diffractive grating has a shape of a second interference pattern formed in a depth direction on a second surface of the diffractive grating material, the second surface opposing the first surface, wherein the shape of the first interference pattern is formed such that a maximum intensity and a minimum intensity of the first interference pattern are formed vertically in the depth direction on the first surface of the diffractive grating material, and wherein the shape of the second interference pattern is formed such that a maximum intensity and a minimum intensity of the second interference pattern are formed at an angle in the depth direction on the second surface of the diffractive grating material, the second surface opposing the first surface.

The expanded diffractive grating may include a transmissive expanded diffractive grating, and the out-coupling diffractive grating includes a reflective out-coupling diffractive grating.

In accordance with an aspect of the disclosure, there is provided an apparatus for recording a holographic diffractive grating structure, the apparatus including a light source configured to output light, a beam splitter configured to split the light into a first light beam and a second light beam, a first expander, a first amplitude filter and a first triangular prism that are provided on a path of the first light beam, and a second expander, a second amplitude filter and a second triangular prism that are provided on a path of the second light beam, wherein the first amplitude filter is configured to direct a first part of the first light beam directly to the first triangular prism and direct a second part of the first light beam, which is different from the first part to the first triangular prism after passing through the first amplitude filter, wherein the first triangular prism includes a first surface on which the first part of the first light beam is incident, a second surface on which the second part of the first light beam is incident, and a first exit surface through which the first part of the first light beam and the second part of the first light beam exits, wherein the second triangular prism includes a first surface on which the second light beam that passes the second amplitude filter is incident and a second exit surface through which the second light beam exits, wherein the second exit surface of the second triangular prism is spaced apart from and parallel to the first exit surface of the first triangular prism, and wherein a diffractive grating material for recording the holographic diffractive grating structure is provided between the first exit surface and the second exit surface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
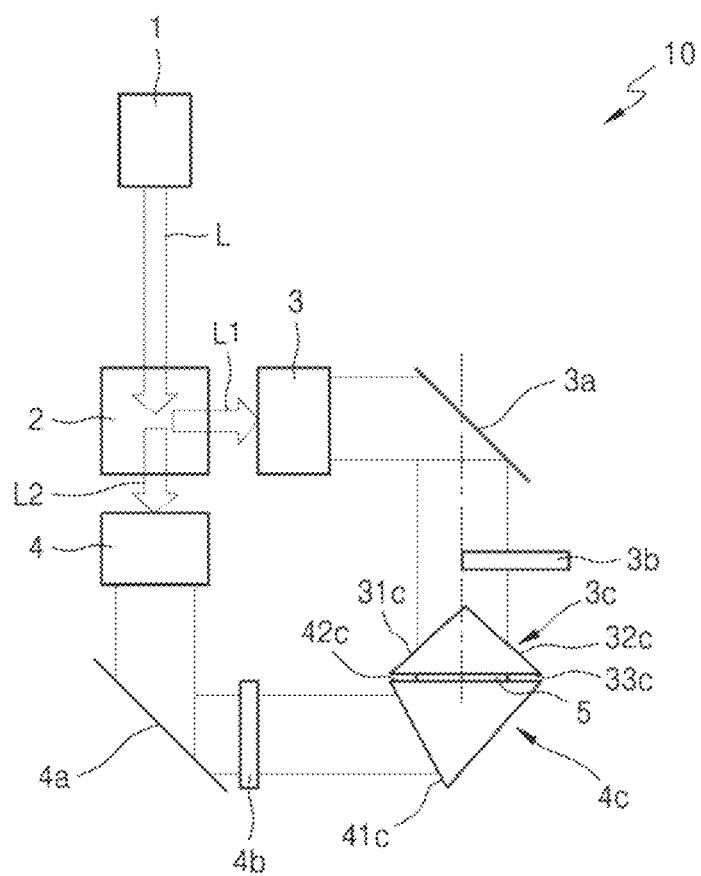
FIG. 1 schematically illustrates an apparatus for recording a holographic diffractive grating structure according to an embodiment.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Although terms used in embodiments of the specification are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

Throughout the disclosure, the expression "at least one of a, b or c" indicates only a, only b, only c, both a and b, both a and c, both b and c, all of a, b, and c, or variations thereof.

As used herein, the singular forms are intended to include the plural forms as well, unless the context clearly indicates otherwise. When it is assumed that a certain part includes a certain component, the term "including" means that a corresponding component may further include other components unless a specific meaning opposed to the corresponding component is written.

In the disclosure, augmented reality (AR) may be displaying a virtual image by overlaying the virtual image on a physical environment space or an object in a real world.

In the disclosure, an AR device may be a device capable of expressing AR, and may include not only AR glasses in the form of glasses worn on a facial part of a user, but also a head-mounted display (HMD) or an AR helmet, etc., worn on a head part of the user.

In the disclosure, an eye motion box (EMB) may be an area within which the eye, while moving, may see the entire virtual image completely, without loss. The EMB is a linear region in the entire field of view, i.e., a space where light beams from any point of an image enter the pupil of the eye. A part of the field of view may be lost outside the EMB. The eye may continuously move and rotate, and at the same time, the pupil of the eye may continuously move. The EMB may be relatively large and match the field of view. The larger the field of view is, the larger the EMB is.

The field of view (viewing angle) of an optical system may be a cone of light beams exiting from the optical system that forms an image. The center of the field of view may correspond to the center of the image, and the edge of the field of view may correspond to the edge of the largest possible image.

The exit pupil (or pupil of the optical system) is a paraxial image of the aperture diaphragm in the image space, and is formed by the subsequent part of the optical system in the direct path of the rays. A property of the exit pupil is that the entire image field exists at any point of the exit pupil. By expanding the exit pupil, the size of the exit pupil may be increased without increasing the longitudinal dimensions of the optical system. A typical optical device makes it possible to increase the size of the exit pupil, but at the same time, the longitudinal dimensions of the optical device also increase. Waveguide optics, due to multiple reflection of light beams inside the waveguide, allow increasing the size of the exit pupil without increasing the longitudinal dimensions.

Diffraction efficiency is a property of a diffractive grating, measured in a percentage or fraction of a basic unit. The diffraction efficiency is a ratio of energy contained in one of the diffraction orders relative to energy incident to a diffractive grating.

Hereinafter, the disclosure will be described with reference to the accompanying drawings.

FIG. 1 schematically illustrates an apparatus 10 for recording a holographic diffractive grating structure 5 according to an embodiment.

Referring to FIG. 1, the apparatus 10 may include a light source 1 and a beam splitter 2. The light source 1 may emit light L. The light source 1 may be a coherent light source. For example, the light source 1 may be a laser light source having a single frequency and a sufficient coherent length. A wavelength of the light source 1 may be selected based on photosensitivity of a diffractive grating material for recording the holographic diffractive grating structure 5, and may be, for example, an ultraviolet (UV) band, a visible light band, or an infrared (IR) band.

The beam splitter 2 may split the light L into a first light beam L1 and a second light beam L2. The beam splitter 2 may be, for example, but not limited to, a cube-type beam splitter or a flat-type beam splitter.

On a path of the first light beam L1, a first amplitude filter 3b and a first triangular prism 3c may be provided.

The first amplitude filter 3b may be arranged such that a first part (see reference numeral A of FIG. 2) of the first light beam L1 directly travels to the first triangular prism 3c without passing through the first amplitude filter 3b and a second part (see reference numeral B1 of FIG. 2) that is different from the first part of the first light beam L1 passes through the first amplitude filter 3b. The first amplitude filter 3b may attenuate the intensity of the second part of the first light beam L1. The second part of the first light beam L1 may be a remaining part of the first light beam L1 except for the first part. For example, the first part of the first light beam L1 may be a half of the first light beam L1, and the second part of the first light beam L1 may be the other half of the first light beam L1, but the disclosure is not limited thereto.

The first triangular prism 3c may be an isosceles triangular prism having a cross section that is an isosceles triangle. The first triangular prism 3c may include a first surface 31c corresponding to one of equal sides of the isosceles triangle, a second surface 32c corresponding to the other of the equal sides of the isosceles triangle, and a third surface (hereinafter, a first exit surface) 33c corresponding to the base of the isosceles triangle.

The first triangular prism 3c may be arranged such that the first part of the first light beam L1 is incident to the first surface 31c of the first triangular prism 3c and then exits from the first exit surface 33c of the first triangular prism 3c, and the second part of the first light beam L1 having passed through the first amplitude filter 3b is incident to the second surface 32c of the first triangular prism 3c and then exits from the first exit surface 33c of the first triangular prism 3c. For example, the first triangular prism 3c may be arranged such that the first part and the second part of the first light beam L1 are incident to the first surface 31c and the second surface 32c of the first triangular prism 3c, at the same incident angle, respectively.

On a light path between the beam splitter 2 and the first amplitude filter 3b, a first light beam expander 3 for expanding the first light beam L1 may be further provided. The first light beam expander 3 may expand a beam width of the first light beam L1. The beam width of the first light beam L1 may be a factor that determines an area of the holographic diffractive grating structure 5 recorded in the diffractive grating material. For example, the first light beam expander 3 may expand the beam width of the first light beam L1 such that the first part of the first light beam L1 illuminates the entire diffractive grating material.

On a light path between the beam splitter 2 and the first triangular prism 3c, a first mirror 3a for changing a direction of the light path of the first light beam L1 may be further provided. For example, the first mirror 3a may be arranged on the light path between the beam splitter 2 and the first amplitude filter 3b such that the first part of the first light beam L1 reflected from the first mirror 3a may directly be incident on the first triangular prism 3c and the other second part of the first light beam L1 reflected from the first mirror 3a may be directly incident on the first amplitude filter 3b. The first mirror 3a may be an example of a light path conversion member for converting a light path of the first light beam L1.

On a path of the second light beam L2, a second amplitude filter 4b and a second triangular prism 4c may be provided.

The second amplitude filter 4b may attenuate the intensity of the second light beam L2.

The second light beam L2 attenuated after passing through the second amplitude filter 4b may reach a first surface 41c of the second triangular prism 4c and be refracted, thus exiting through an adjacent second surface (hereinafter, a second exit surface) 42c of the second triangular prism 4c. A shape of the second triangular prism 4c may be different from that of the first triangular prism 3c. An exit angle of the second light beam L2 exiting through the second exit surface 42c of the second triangular prism 4c may be selected according to a direction of a second interference pattern to be described later.

The second triangular prism 4c may be arranged such that the second exit surface 42c thereof is separated and spaced apart from and parallel to the first exit surface 33c of the first triangular prism 3c. In a space between the first exit surface 33c of the first triangular prism 3c and the second exit surface 42c of the second triangular prism 4c, the diffractive grating material may be provided to record the holographic diffractive grating structure 5 thereon.

On a light path between the beam splitter 2 and the second amplitude filter 4b, a second light beam expander 4 for expanding the second light beam L2 may be further provided. The second light beam expander 4 may expand a beam width of the second light beam L2. The beam width of the second light beam L2 may be a factor that determines an area of the holographic diffractive grating structure 5 recorded in the diffractive grating material.

On a light path between the beam splitter 2 and the second triangular prism 4c, a second mirror 4a for changing a direction of the light path of the second light beam L2 may be further provided. For example, the second mirror 4a may be arranged on the light path between the beam splitter 2 and the second amplitude filter 4b. The second mirror 4a may be an example of a light path conversion member for converting the light path of the second light beam L2.

Figure 2:
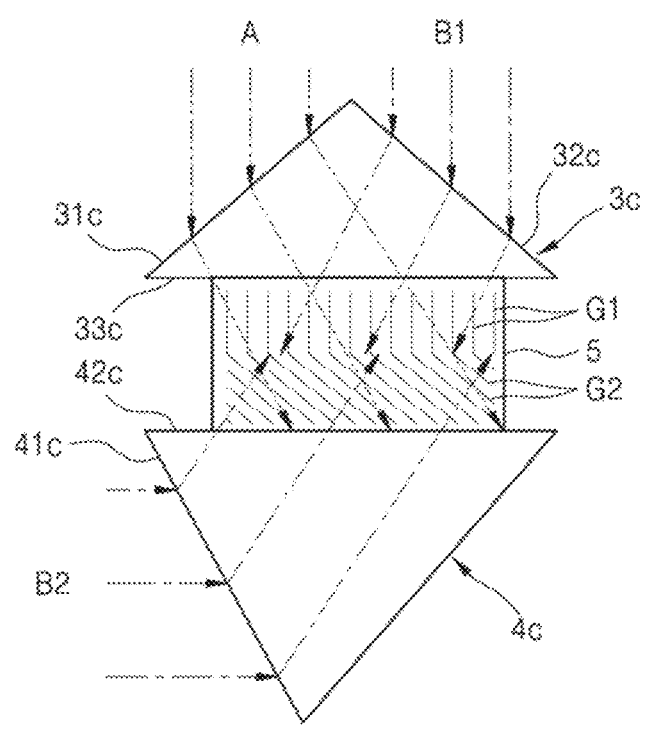
FIG. 2 illustrates a prism system in which a diffractive grating material is located in an apparatus for recording a holographic diffractive grating structure according to an embodiment.

FIG. 2 illustrates a prism system in which a diffractive grating material is provided in the apparatus 10 for recording the holographic diffractive grating structure 5 according to an embodiment.

Referring to FIG. 2, the prism system of the apparatus 10 for recording the holographic diffractive grating structure 5 may include the first triangular prism 3c and the second triangular prism 4c. The first triangular prism 3c and the second triangular prism 4c may be arranged such that the first exit surface 33c of the first triangular prism 3c and the second exit surface 42c of the second triangular prism 4c are separated from and parallel to each other. In the space between the first exit surface 33c of the first triangular prism 3c and the second exit surface 42c of the second triangular prism 4c, the holographic diffractive grating structure 5 may be recorded. The diffractive grating material for recording the holographic diffractive grating structure 5 may be provided between the first exit surface 33c of the first triangular prism 3c and the second exit surface 42c of the second triangular prism 4c. The diffractive grating material may be a material for recording a volume holographic diffractive grating.

Figure 4:
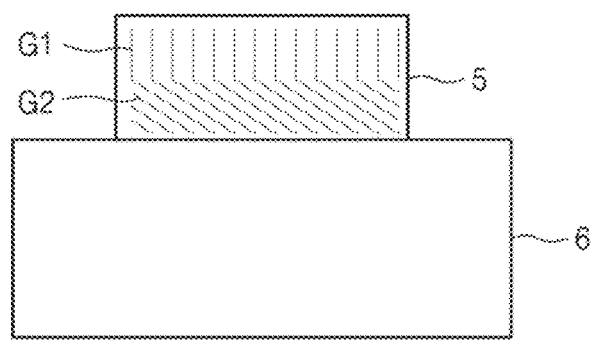
FIG. 4 illustrates a diffractive grating material applied to a waveguide according to an embodiment.

In an embodiment of the disclosure, the diffractive grating material may be formed as a layer of a certain thickness by being applied on a surface of a waveguide (see reference numeral 6 of FIG. 4). In an embodiment of the disclosure, the diffractive grating material may be formed as a layer of a certain thickness, by being applied to the first exit surface 33c of the first triangular prism 3c. In an embodiment of the disclosure, the diffractive grating material may be formed as a layer of a certain thickness, by being applied to the second exit surface 42c of the second triangular prism 4c. When the diffractive grating material is applied to the first triangular prism 3c or the second triangular prism 4c, as a process subsequent to recording of the holographic diffractive grating structure 5 on the diffractive grating material, the diffractive grating material may be separated from the first triangular prism 3c or the second triangular prism 4c such that the holographic diffractive grating structure 5 may be used in the form of a film. A scheme to apply the diffractive grating material may be various. For example, the diffractive grating material may be applied by spreading or spraying the diffractive grating material in a liquid form, etc., or by rolling the diffractive grating material using a roller.

A transparent photosensitive material such a photopolymer, photorefractive glass, etc., may be used as the diffractive grating material. A known transparent photosensitive material may be used as, but not limited to, the diffractive grating material. The holographic diffractive grating structure 5 may be recorded on a material that has not been regarded as being photosensitive, e.g., general glass.

Next, an operation of the apparatus 10 for recording the holographic diffractive grating structure 5 will be described with reference to FIGS. 1 and 2.

The light L exiting from the light source 1 may be incident on the beam splitter 2. The light L may be split by the beam splitter 2 into the first light beam L1 and the second light beam L2.

The first light beam L1 may pass through the first light beam expander 3. The first light beam expander 3 may expand the first light beam L1 having coherency and narrow directivity. Thereafter, the first light beam L1 may reach the first mirror 3a that directs the first light beam L1 toward the first triangular prism 3c. The first part (see A of FIG. 2) of the first light beam L1 may travel to the first triangular prism 3c without attenuation, but the second part (see B1 of FIG. 2) of the first light beam L1 may undergo intensity attenuation while passing through the first amplitude filter 3b.

The non-attenuated first part of the first light beam L1 may be refracted from the first surface 31c of the first triangular prism 3c into the first triangular prism 3c and exit through the first exit surface 33c.

The attenuated second part of the first light beam L1 after passing through the first amplitude filter 3b may be refracted from the second surface 32c of the first triangular prism 3c into the first triangular prism 3c and exit through the first exit surface 33c.

The second light beam L2 may be incident on the second light beam expander 4, then the second mirror 4a, and then the second amplitude filter 4b, attenuating the intensity of the second light beam L2. The attenuated second light beam L2 may be refracted from the first surface 41c of the second triangular prism 4c into the second triangular prism 4c and exit through the second exit surface 42c.

As shown in FIG. 2, the first triangular prism 3c may be located such that the first part A of the first light beam L1 that does not pass through the first amplitude filter 3b reaches one of side surfaces of the first triangular prism 3c, i.e., the first surface 31c. The first part A of the first light beam L1 will be referred to as a reference beam A. The reference beam A is not attenuated by the first amplitude filter 3b, and thus is adjusted to pass through the entire diffractive grating material. The second part B1 of the first light beam L1 attenuated by the first amplitude filter 3b may reach another side surface of the first triangular prism 3c, i.e., the second surface 32c. The second part B1 will be referred to as a first object beam B1. The second light beam L2 which is attenuated by the second amplitude filter 4b and reaches the first surface 41c of the second triangular prism 4c will be referred to as a second object beam B2.

The reference beam A and the first object beam B1 may be incident to opposite side surfaces (i.e., the first surface 31c and the second surface 32c) of the first triangular prism 3c, respectively, at the same incident angle. In this case, the first surface 31c and the second surface 32c of the first triangular prism 3c have the same angle with respect to the first exit surface 33c that is the base (that is, the first triangular prism 3c is an isosceles triangular prism), such that the reference beam A and the first object beam B1 may exit at the same exit angle with respect to a normal of the first exit surface 33c. Thus, the reference beam A and the first object beam B1 may reach the diffractive grating material at the same angle with respect to the normal of the first surface of the diffractive grating material (the top surface of the diffractive grating material in FIG. 2), such that an interference pattern is generated where maximum and minimum points of an interference pattern intensity (i.e., maximum and minimum intensities) are arranged vertically in a depth direction on the first surface (the top surface) of the diffractive grating material, i.e., across the thickness of the diffractive grating material. The interference pattern formed vertically on the first surface (the top surface) of the diffractive grating material may provide an expanding diffractive grating G1 with a vertical structure. The attenuated first object beam B1 may be absorbed in the diffractive grating material and substantially disappear in a depth at a particular distance of the diffractive grating material, such that a recording depth may be achieved by selecting transmission coefficients of the first amplitude filter 3b and the second amplitude filter 4b. For example, by properly attenuating the intensity of the first object beam B1, the expanding diffractive grating G1 may be recorded on a half of the diffractive grating material.

The reference beam A may illuminate the entire diffractive grating material at high intensity because the reference beam A is not attenuated by the first amplitude filter 3b, and generate an interference pattern with both the first object beam B1 and the second object beam B2. The attenuated first object beam B1 may illuminate only a part of the diffractive grating material because the first object beam B1 is attenuated by the first amplitude filter 3b.

The diffractive grating material may have properties of photosensitivity and strong light absorption, such that in a position of a material on which light is incident on, a chemical reaction occurs and a change in a refractive index of the material occurs. By selecting an exposure time, depth of change in the refractive index of the diffractive grating material may be adjusted.

As shown in FIG. 1, the second triangular prism 4c may be located such that the second object beam B2 attenuated by the second amplitude filter 4b reaches one of the side surfaces (i.e., the first surface 41c). The shape of the second triangular prism 4c is different from that of the first triangular prism 3c, such that an incident angle at which the reference beam A is incident to the first surface (the top surface) of the diffractive grating material is different from an incident angle at which the second object beam B2 is incident to the second surface (the bottom surface) of the diffractive grating material, and thus rays forming the interference pattern obtained by the reference beam A and the second object beam B2 may be inclined at a certain angle with respect to the surface of the diffractive grating material.

The maximum and minimum points of the interference pattern intensity (i.e., maximum and minimum intensities) may be arranged slantly at an angle with respect to a depth direction on the second surface (the bottom surface) of the diffractive grating material, and the diffractive grating material on which the interference pattern is recorded may form an out-coupling diffractive grating G2.

The expanding diffractive grating G1 may be formed to a certain depth on the first surface (the top surface) of the diffractive grating material 5, and the out-coupling diffractive grating G2 may be formed to a certain depth on the second surface (the bottom surface) opposing the first surface of the diffractive grating material 5.

A wave vector of a diffractive grating may be perpendicular to grating grooves and may be located on the same plane as a working surface. A modulus of the wave vector of the diffractive grating is RI=27/d (d is a period of the diffractive grating). The wave vector of the out-coupling diffractive grating G2 may not be in the plane of the diffractive grating material, ensuring that light is removed from the waveguide during an operation in the AR device. Recording of the holographic diffractive grating structure 5 uses a strong reference beam and an attenuated object beam, such that the holographic diffractive grating is recorded to a certain depth of the diffractive grating material and absorption of the attenuated object beam by the diffractive grating material may not substantially occur in the depth. There may be no interference pattern in a place where the attenuated object beam begins to be absorbed by the diffractive grating material.

Surface periods of the expanding diffractive grating G1 and the out-coupling diffractive grating G2 should be the same as each other. This is because, when the surface periods of the expanding diffractive grating G1 and the out-coupling diffractive grating G2 are different from each other, double imaging may occur and a part of the field of view may be lost due to the angular selectivity of the diffractive gratings. The surface periods of the diffractive gratings may be provided by geometric structures and refractive indexes of the first triangular prism 3c and the second triangular prism 4c, and thus the first triangular prism 3c and the second triangular prism 4c should be selected such that the surface periods of the expanding diffractive grating G1 and the out-coupling diffractive grating G2 to be recorded are the same. This selection may be determined by calculation for a desired period of the diffractive grating. That is, respective angles of the first triangular prism 3c and the second triangular prism 4c may define specific periods of the diffractive gratings.

Figure 3:
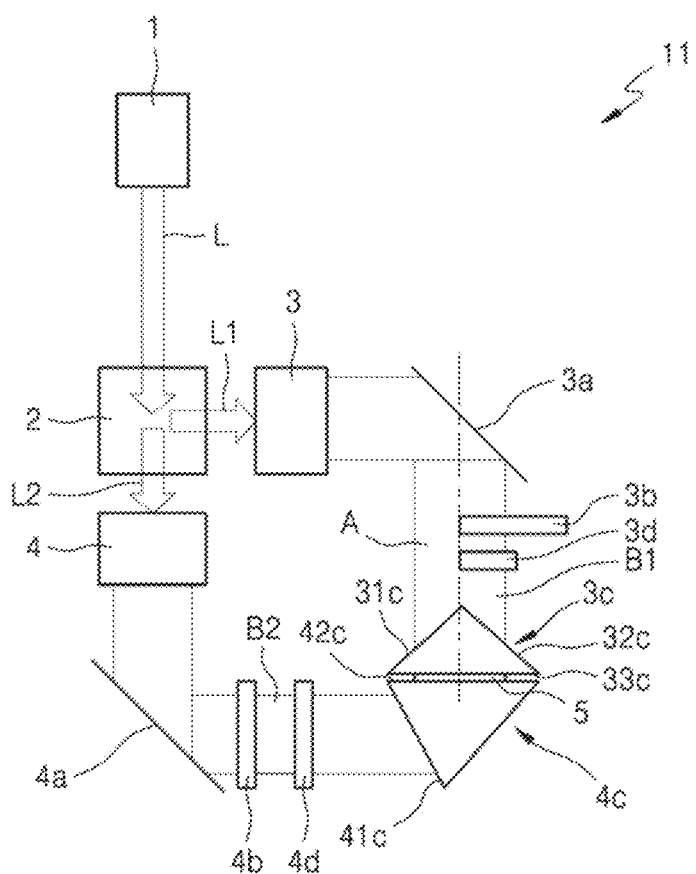
FIG. 3 schematically illustrates an apparatus for recording a holographic diffractive grating structure according to an embodiment.

FIG. 3 schematically illustrates an apparatus 11 for recording the holographic diffractive grating structure 5 according to an embodiment.

Referring to FIG. 3, the apparatus 11 for recording the holographic diffractive grating structure 5 may further include a first shutter 3d and a second shutter 4d that periodically open and close with respect to the first object beam B1 and the second object beam B2 and are controlled by a controller. The first shutter 3d may be arranged on the light path of the first object beam B1 between the first amplitude filter 3b and the first triangular prism 3c, and the second shutter 4d may be arranged on the light path of the second object beam B2 between the second amplitude filter 4b and the second triangular prism 4c. The first shutter 3d and the second shutter 4d may be, but not limited to, mechanical shutters. The first shutter 3d and/or the second shutter 4d may be of a type using a polarization rotator, and may be used without mechanical rotation or motion, unlike a mechanical shutter.

The first shutter 3d and the second shutter 4d may alternately provide opening of the first object beam B1 and the second object beam B2. The reference beam A may travel to the diffractive grating material, regardless of opening and closing operations of the first shutter 3d and the second shutter 4d. In a first operation, the first shutter 3d may be opened and the second shutter 4d may be closed, such that the expanding diffractive grating (see G1 of FIG. 2) may be recorded by the first object beam B1 and the reference beam A. In a second operation subsequent to the first operation, the first shutter 3d may be closed and the second shutter 4d may be opened, such that the out-coupling diffractive grating (see G2 of FIG. 2) may be recorded by the second object beam B2 and the reference beam A. Such a recording method may guarantee that the first object beam B1 and the second object beam B2 do not exist at the same time during recording. That is, the apparatus 11 according to the current embodiment of the disclosure may eliminate the recording of parasitic interference patterns, that is, parasitic diffractive gratings without causing interference between the first object beam B1 and the second object beam B2. The first shutter 3d and the second shutter 4d may operate asynchronously at high switching frequency.

FIG. 4 illustrates a diffractive grating material applied to a waveguide 6 according to an embodiment of the disclosure.

Referring to FIG. 4, the diffractive grating material may be applied to the waveguide 6. The holographic diffractive grating structure 5 formed on the diffractive grating material applied to the waveguide 6 may include the expanding diffractive grating G1 and the out-coupling diffractive grating G2.

The wave vector of the expanding diffractive grating G1 may be directed along the diffractive grating material. That is, the wave vector of the expanding diffractive grating G1 may be directed in parallel to the surface of the diffractive grating material. The wave vector of the out-coupling diffractive grating G2 may have a vertical component directed in a thickness direction of the diffractive grating material. The surface periods of the expanding diffractive grating G1 and the out-coupling diffractive grating G2 are the same as each other. The expanding diffractive grating G1 may be a transmissive diffractive grating, and the out-coupling diffractive grating G2 may be a reflective diffractive grating. The expanding diffractive grating G1 and the out-coupling diffractive grating G2 are recorded on the same diffractive grating material of one layer, enabling compactness, ease of manufacturing, and low cost of the AR device based on the waveguide 6 having the holographic diffractive grating structure 5.

The holographic diffractive grating structure 5 recorded on the diffractive grating material provides photo-selectivity, and the smaller the thickness of the diffractive grating is, the wider the region of angular selectivity is. The angular selectivity may be referred to as an angular range in which light incident to the diffractive grating is diffractable. The wider the angular selectivity is, the wider the angular range in which light is diffractable in the diffractive grating is, and therefore, the field of view that is diffractable in such a diffractive grating may be widen. The selectivity of the diffractive grating does not affect an EMB, and the EMB may be increased due to the fact that all the diffractive gratings may be located in one place by waveguides with equal dimensions, and thus a large effective zone of light out-coupling into the eye may be obtained.

Grooves of the expanding diffractive grating may be oriented during manufacturing in such a way that a part of the resulting diffraction orders of the incident light is directed along the diffractive grating material experiencing total internal reflection (i.e., in parallel to the surface of the diffractive grating material).

In the expanding diffractive grating, as a result of diffraction, light may be divided into several beams if different diffraction orders that then propagate at certain angles relative to the incident beam. The expanding diffractive grating may form at least two diffraction orders. The beam of a diffraction zero order "0", which does not change the direction of propagation relative to the incident direction, may return at the same angle to the holographic diffractive grating structure 5 due to the effect of total internal reflection at the material-air interface. The direction of a "+1" diffraction order may coincide with the angular selectivity of the out-coupling diffractive grating. The beam of the "+1" diffraction order may fall on the out-coupling diffractive grating and may be divided into two main orders, i.e., the diffraction zero order and the "+1" diffraction order in the out-coupling diffractive grating. Herein, the beam of the diffraction zero order may propagate into the holographic diffractive grating structure 5 due to total internal reflection, and the beam of the "+1" diffraction order may propagate at an angle at which the beam exits from the holographic diffractive grating structure 5.

The diffractive gratings are very thin and there is a diffraction zero order that propagates without changing a direction, such that the order of the expanding diffractive grating and the out-coupling diffractive grating may be irrelevant, and thus the order in which light enters the expanding diffractive grating or the out-coupling diffractive grating does not matter. The incident light may first reach the reflecting out-coupling diffractive grating, but may pass unchanged without being diffracted because the incident light is not incident beyond the range of angular selectivity. Thus, diffraction of the incident light may occur only in the expanding diffractive grating, a propagation angle of a first diffraction order may be different from a diffraction zero order after diffraction and fall in the region of angular selectivity of the out-coupling diffractive grating, such that beams of the first diffraction order are allowed to be diffracted on the out-coupling diffractive grating.

Each of the beams of the diffraction zero order (i.e., the "0" diffraction order) may remain in the diffractive grating material including the holographic diffractive grating structure 5 due to total internal reflection, and, after passing from the expanding diffractive grating G1 to the reflecting out-coupling diffractive grating G2, may become diffracted and form again "0" and "+1" diffraction orders. The beams of the "+1" diffraction order may leave the expanding diffractive grating G1 and enter the reflecting out-coupling diffractive grating, form again "0" and "+1" diffraction orders, and then the beams of the "+1" diffraction order may leave the holographic diffractive grating structure 5. The beams of the "0" diffraction order may propagate again in the diffractive grating material including the holographic diffractive grating structure 5 as described above, and produce new "0" and "+1" diffraction orders, as a result of which the exit pupil may be expanded relative to the original light trapped in the diffractive grating material having the holographic diffractive grating structure 5. The holographic diffractive grating structure 5 is generally formed in the diffractive grating material of a very thin layer having no sufficient rigidity, such that the waveguide 6 may play the role of a solid and rigid substrate ensuring the stability of the holographic diffractive grating structure 5 in space and time. The waveguide 6 may be several times thicker than the holographic diffractive grating structure 5 and increase a beam path to a neighboring point of total internal reflection (TIR).

Figure 5A:
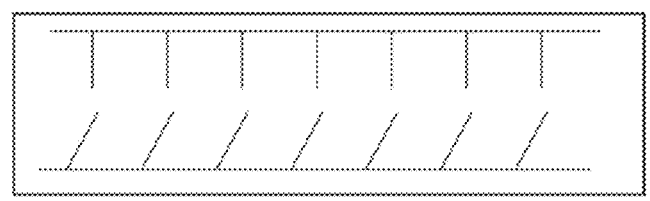
FIG. 5A illustrates a holographic diffractive grating structure according to an embodiment.

FIG. 5A illustrates a holographic diffractive grating structure according to an embodiment. Referring to FIG. 5A, the holographic diffractive grating structure may include an expanding diffractive grating and an out-coupling diffractive grating, and in a diffractive grating material, an unrecorded material layer may remain between the expanding diffractive grating and the out-coupling diffractive grating. In the current embodiment of the disclosure, the parasitic diffractive grating may not be generated, but the diffraction efficiency of the diffractive grating may be relatively low.

Figure 5B:
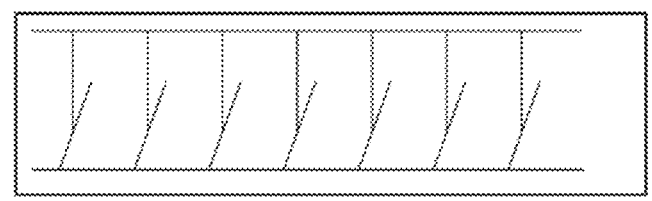
FIG. 5B illustrates a holographic diffractive grating structure according to an embodiment.

FIG. 5B illustrates a holographic diffractive grating structure according to an embodiment. Referring to FIG. 5B, the holographic diffractive grating structure may have a structure where an expanding diffractive grating and an out-coupling diffractive grating partially overlap each other. In such an embodiment of the disclosure, high efficiency of the diffractive gratings may be achieved, but parasitic diffractive gratings may be generated, which may arise from interference patterns of minor rays. For example, the parasitic diffractive gratings may be generated when beams are reflected from edges or Fresnel reflections.

Figure 5C:
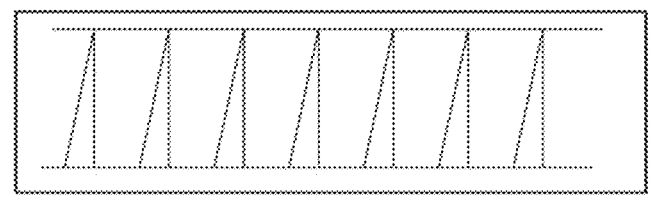
FIG. 5C illustrates a holographic diffractive grating structure according to an embodiment.

FIG. 5C illustrates a holographic diffractive grating structure according to an embodiment. Referring to FIG. 5C, the holographic diffractive grating structure may a structure where an expanding diffractive grating and an out-coupling diffractive grating completely overlap each other. That is, the expanding diffractive grating and the out-coupling diffractive grating may be recorded across the entire diffractive grating material in the thickness direction thereof. The holographic diffractive grating structure according to the current embodiment of the disclosure may have a parasitic diffractive grating in spite of high diffraction efficiency.

By adjusting the intensity of the light in a manufacturing process, the depth of a recorded diffractive grating may be adjusted. In addition, depending on how much the light is attenuated by the amplitude filters, it is possible to record the diffractive grating to a partial depth of the diffractive grating material, as shown in FIG. 5A. That is, between the expanding diffractive grating and the out-coupling diffractive grating, there may be an "unrecorded" layer of the diffractive grating material. The diffraction efficiency of the diffractive grating may vary with the thickness of the unrecorded layer. Different depths of the holographic diffractive gratings may provide different diffraction efficiencies. In relation to expansion (multiplication) and light output, the diffractive gratings are characterized by the fact that for these two gratings, the diffraction efficiency may be much lower than the diffraction efficiency of one diffractive grating in order to ensure expansion and output of light for uniform distribution and uniform field of view.

At high diffraction efficiency, a large amount of energy may be spent in the first diffraction order, and there may be little energy left for further expansion (through the zero order). Only a small part of the light energy may reach the edge of the out-coupling or expanding region, and the energy of the light arriving at the edge may be weaker than that of the light in initial diffraction, such that the holographic diffractive grating structure including the expanding diffractive grating and the out-coupling diffractive grating may generate an image that is uneven in brightness or the intensity of the output light may be lower than the sensitivity threshold of the eye, at the high diffraction efficiency. Thus, the diffraction efficiencies of the expanding diffractive grating and the out-coupling diffractive grating need to be on the order of a few percent.

In an embodiment of the disclosure, the first amplitude filter 3b and the second amplitude filter 4b may have different transmittances. For example, a transmittance of the first amplitude filter 3b may be lower and a transmittance of the second amplitude filter 4b may be higher, such that the first object beam B1 may become weak and thus the expanding diffractive grating may be recorded to a smaller thickness and the second object beam B2 may become stronger and thus the out-coupling diffractive grating may be recorded to a larger thickness. Needless to say, the transmittance of the first amplitude filter 3b may be higher and the transmittance of the second amplitude filter 4b may be lower, and in this case, the thickness of the expanding diffractive grating and the thickness of the out-coupling diffractive grating may be opposite to the previous example. As such, the expanding diffractive grating and the out-coupling diffractive grating have different thicknesses, and thus have different diffraction efficiencies.

In an embodiment of the disclosure, one of the shutters may be opened for a longer time and the other shutter may be opened for a shorter time. As the exposure time becomes long, i.e., the shutter is opened for a long time during manufacturing, the diffractive grating may be recorded to a greater thickness, such that the diffractive grating is recorded for a higher diffraction efficiency.

Figure 6:
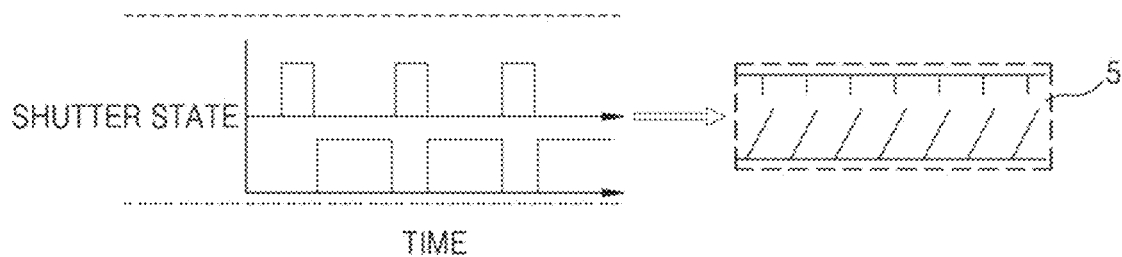
FIG. 6 illustrates a cyclogram and a holographic diffractive grating structure of a diffractive grating material obtained by the cyclogram according to an embodiment.

FIG. 6 illustrates a cyclogram and the holographic diffractive grating structure 5 of a diffractive grating material obtained by the cyclogram according to an embodiment.

In the cyclogram in the left side of FIG. 6, time is indicated along a horizontal axis and zero or one signal corresponding to the opening/closing state of a shutter is indicated along a vertical axis. In the cyclogram, an upper graph indicates an operating timing of a first shutter (3d of FIG. 3) and a lower graph indicates an operating timing of a second shutter (4d of FIG. 3).

In an embodiment of the disclosure, as shown in the cyclogram of FIG. 6, the first shutter 3d and the second shutter 4d may be activated alternately with each other, in which the second shutter 4d may be opened for a longer time than the first shutter 3d. Thus, the exposure time of the second object beam B2 becomes longer, and the light dose of the second object beam B2 exposed to the diffractive grating material may increase, such that the thickness of the out-coupling diffractive grating related to the second object beam B2 becomes greater than that of the expanding diffractive grating related to the first object beam B1. This may mean that the out-coupling diffractive grating in a lower side of the diffractive grating material may have a higher efficiency than the expanding diffractive grating in an upper side of the diffractive grating material.

In an embodiment of the disclosure, the first shutter 3d is opened for a longer time than the second shutter 4d, such that the expanding diffractive grating may have a higher efficiency than the out-coupling diffractive grating.

Figure 7A:
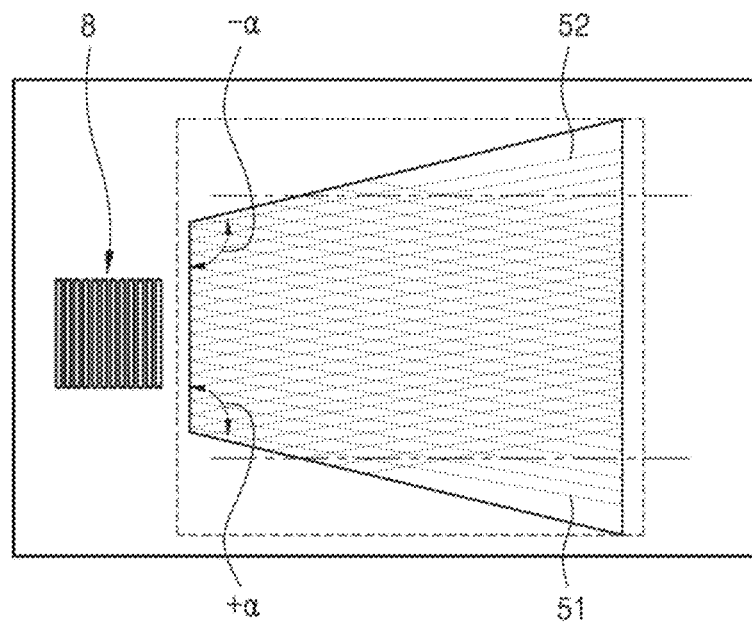
FIG. 7A is a plane view of a holographic diffractive grating structure recorded in one recording material layer according to an embodiment.
Figure 7B:
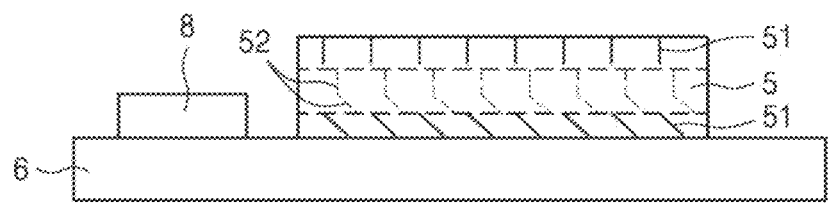
FIG. 7B is a side view of the holographic diffractive grating structure of FIG. 7A.

FIG. 7A is a plan view of a holographic diffractive grating structure 5 recorded in a single diffractive grating material according to an embodiment of the disclosure, and FIG. 7B is a side view of the holographic diffractive grating structure 5 of FIG. 7A.

Referring to FIGS. 7A and 7B, the diffractive grating material may be applied to the waveguide 6 including an input diffraction element 8 to form a single layer. The input diffraction element 8 may be an in-coupling diffractive grating. The holographic diffractive grating structures 5 having a double structure may be recorded in the diffractive grating material. A first structure 51 of the double structure of the holographic diffractive grating structures 5 may include a first expanding diffractive grating and a first out-coupling diffractive grating corresponding thereto, and the other of the double structure of the holographic diffractive gratings 5, i.e., a second structure 52 may include a second expanding diffractive grating and a second out-coupling diffractive grating corresponding thereto. The first expanding diffractive grating and the second expanding diffractive grating may be transmissive, and the first out-coupling diffractive grating and the second out-coupling diffractive grating may be reflective. The first structure 51 and the second structure 52 may be formed rotated by a certain angle with respect to each other. Due to the double structure the holographic diffractive grating structures 5 may provide a maximum field of view that may be guided through the waveguide 6 and expanded to the eye. In this case, the zero level may be taken as a vector of the input diffraction element 8 or a line in the plane of the waveguide 6 along which the center of the field of view propagates after the input diffraction element 8.

In the diffractive grating material having the double structure of the holographic diffractive grating structures 5, based on the zero level, the first structure 51 of the double structure may be rotated by an angle of $+\alpha$ and the second structure 52 of the double structure may be rotated by an angle of $-\alpha$. That is, in the thickness direction of the diffractive grating material, the first and the second structure 51 and 52 of the holographic diffractive grating structures 5 may be provided relative to each other at a certain angle.

As shown in FIG. 7A, light may reach the first expanding diffractive grating rotated by an angle of $+\alpha$, on which the "0" diffraction order and the "+1" diffraction order are formed. The "+1" diffraction order may correspond to the selectivity of the second out-coupling diffractive grating. That is, the "+1" diffraction order may bypass the second expanding diffractive grating and immediately reach the second out-coupling grating.

In an embodiment of the disclosure, in a projector system that projects light to the waveguide 6, the field of view may be vertically divided into two parts, i.e., a first upper part and a second lower part. Rays from the first part and the second part of the field of view may be incident to the waveguide 6 through the input diffractive element 8.

Expansion of the rays from the first part of the field of view may be achieved by the first expanding diffractive grating of the first structure and output may be achieved by the first out-coupling diffractive grating of the first structure. That is, light corresponding to the first part of the field of view, which has passed through the input diffractive element 8, falls within the range of angular selectivity of the first expanding diffractive grating of the first structure, but beyond the range of angular selectivity of the second expanding diffractive grating of the second structure, such that the light may be diffracted only in the first expanding diffractive grating of the first structure. During diffraction in the first expanding diffractive grating, the "0" diffraction order and the "+1" diffraction order may be formed, in which the beams of the "0" diffraction order may further propagate along the waveguide 6 without changing a direction, and may be diffracted again in the first expanding diffractive grating of the first structure. The "+1" diffraction order may have a propagation angle that is different from that of the "0" diffraction order, and the propagation angle of the "+1" diffraction order may be within a range of the angular selectivity of the second out-coupling diffractive grating of the second structure. Thus, the "+1" diffraction order may be diffracted only in the second out-coupling diffractive grating to form the "0" diffraction order and the "+1" diffraction order, among which the beams of the "0" diffraction order continue traveling inside the waveguide 6 without changing a direction and the beams of the "+1" diffraction order may leave the waveguide 6 and enter the user's eye.

Expansion of the rays from the second part of the field of view may be in the second expanding diffractive grating of the second structure, and output may be in the first out-coupling diffractive grating of the first structure. That is, light corresponding to the second part of the field of view, which has passed through the input diffractive element 8, is incident within the range of angular selectivity of the second expanding diffractive grating of the second structure, but beyond the range of angular selectivity of the first expanding diffractive grating of the first structure, such that the light may be diffracted only in the second expanding diffractive grating of the second structure. During diffraction, the "0" diffraction order and the "+1" diffraction order may be formed, in which the beams of the "0" diffraction order may further propagate along the waveguide 6 without changing a direction and may be diffracted again in the second expanding diffractive grating of the second structure. The "+1" diffraction order may have a propagation angle that is different from that of the "0" diffraction order, and this propagation angle may correspond to the selectivity of the first out-coupling diffractive grating of the first structure. Thus, the "+1" diffraction order may be diffracted only in the first out-coupling diffractive grating to form the "0" diffraction order and the "+1" diffraction order, among which the beams of the "0" diffraction order continue traveling inside the waveguide 6 without changing a direction and the beams of the "+1" diffraction order may leave the waveguide 6 and enter the user's eye.

The above-described double structure of the holographic diffractive grating structure 5 may allow the field of view to be increased at least twice, due to rotation of each structure by +α and −α.

Figure 8:
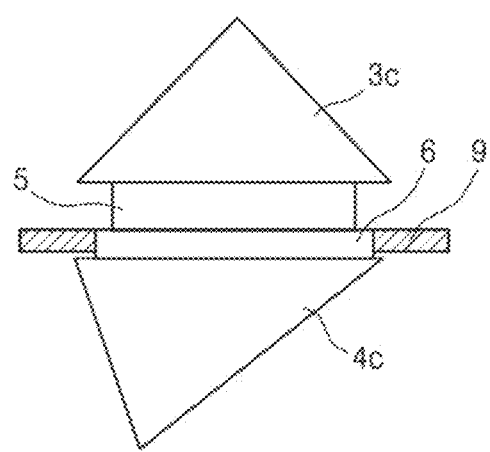
FIG. 8 illustrates a prism system in which a rotation table is arranged in an apparatus for recording a holographic diffractive grating structure according to an embodiment.

FIG. 8 illustrates a prism system in which a rotation table is arranged, in an apparatus for recording the holographic diffractive grating structure 5 according to an embodiment. Referring to FIG. 8, a description will be made of an apparatus and method for recording two holographic diffractive grating structures 5 in one diffractive grating material.

The apparatus according to the current embodiment of the disclosure may be substantially the same as the apparatuses 10 and 11 described with reference to FIG. 1 or 3 except that a rotation table 9 is further provided. A diffractive grating material may be placed on the rotation table 9 and provided in a space between the first triangular prism 3c and the second triangular prism 4c. As illustrated in FIG. 8, the diffractive grating material may be applied to the waveguide 6 that may be placed on the rotation table 9. To radiate light to a top surface and a bottom surface of the diffractive grating material, the rotation table 9 may be perforated in a portion corresponding to the area of the diffractive grating material or the waveguide 6 or a transparent member may be disposed on the corresponding portion.

The rotation table 9 may be rotated by an angle of +α, and a first structure of diffractive gratings including a first expanding diffractive grating and a first out-coupling diffractive grating may be recorded on an upper portion and a lower portion of the diffractive grating material in a first time period. Next, the light source may be turned off or the rotation table 9 may be rotated by an angle of −α in a state where the first and second object beams are blocked by the first shutter and the second shutter. Thereafter, in a second time period, a second structure including a second expanding diffractive grating and a second out-coupling diffractive grating may be recorded on the diffractive grating material. A photosensitive reaction occurs in a section from the surface of the diffractive grating material to a certain depth, and the photosensitivity in the section of the diffractive grating material has worn out, such that recording may not be performed any longer in this section. Thus, all subsequent gratings may be recorded at a greater depth of the diffractive grating material.

Figure 9A:
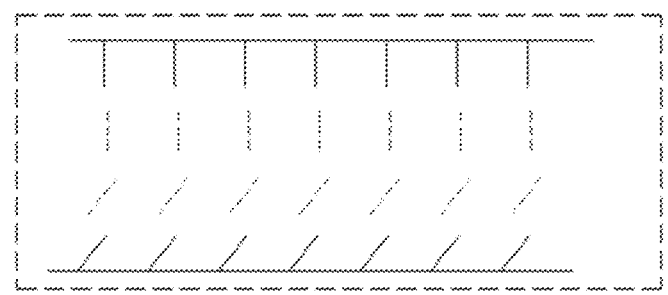
FIG. 9A illustrates a double structure of diffractive gratings according to an embodiment.

FIG. 9A illustrates a double structure of diffractive gratings according to an embodiment. In FIG. 9A, solid lines indicate structures recorded upon rotation by +α, and dashed lines indicate structures recorded upon rotation by −α.

Referring to FIG. 9A, the double structures of the diffractive gratings may have a gap therein. The double structures of the diffractive gratings according to the current embodiment of the disclosure may have no parasitic diffractive grating and low diffraction efficiency.

Figure 9B:
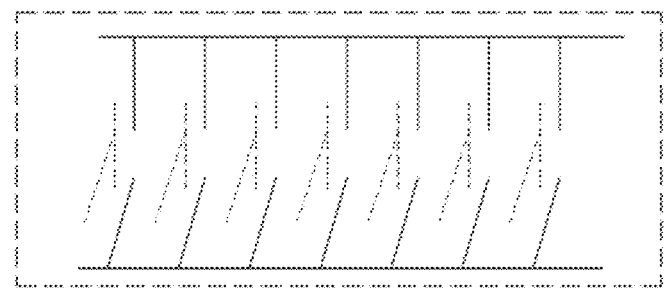
FIG. 9B illustrates a double structure of diffractive gratings according to an embodiment.

FIG. 9B illustrates a double structure of diffractive gratings according to an embodiment. Referring to FIG. 9B, the double structures of the diffractive gratings may partially overlap. The double structures of the diffractive gratings according to the current embodiment of the disclosure may have a parasitic diffractive grating and high diffraction efficiency.

Figure 9C:
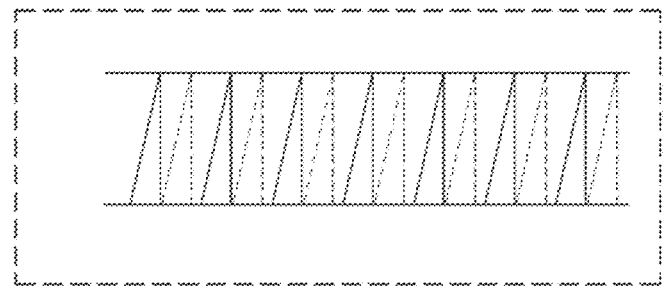
FIG. 9C illustrates a double structure of diffractive gratings according to an embodiment.

FIG. 9C illustrates a double structure of diffractive gratings according to an embodiment. Referring to FIG. 9C, the first structure and the second structure of the double structures of the diffractive gratings may be recorded across the entire thickness of the diffractive grating material. The double structures of the diffractive gratings according to the current embodiment of the disclosure may have a parasitic diffractive grating and high diffraction efficiency. When recording is performed using the shutter described with reference to FIG. 3, there may be no parasitic diffractive grating.

Figure 10A:
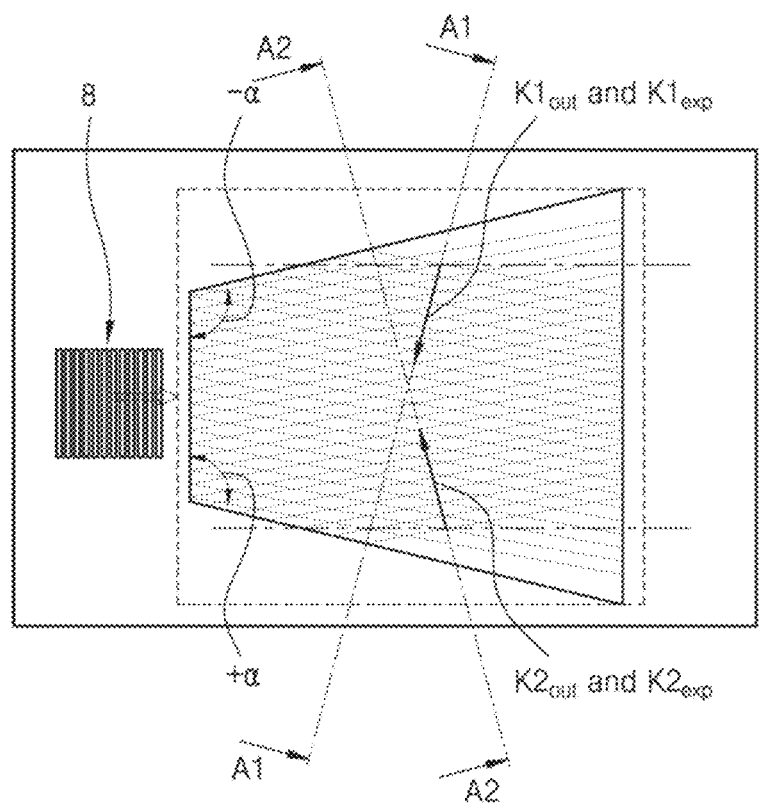
FIG. 10A is a plane view of a single waveguide in which holographic diffractive grating structures are stacked according to an embodiment.
Figure 10B:
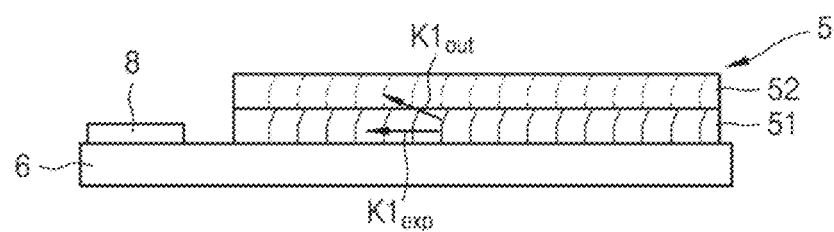
FIG. 10B is a side cross-sectional view taken along a line A1-A1 of FIG. 10A.
Figure 10C:
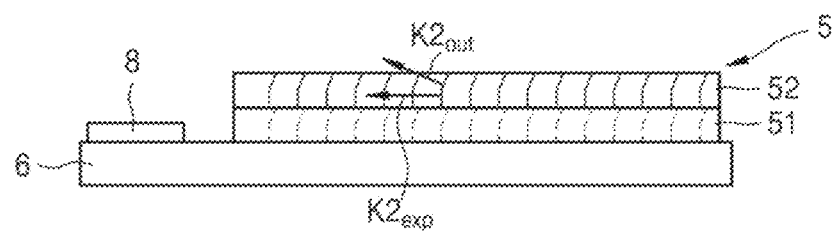
FIG. 10C is a side cross-sectional view taken along a line A2-A2 of FIG. 10A.

FIG. 10A is a plan view of a single waveguide in which the holographic diffractive grating structure 5 according to an embodiment of the disclosure is stacked, FIG. 10B is a side cross-sectional view taken along a line A1-A1 of FIG. 10A, and FIG. 10C is a side cross-sectional view taken along a line A2-A2 of FIG. 10A.

Referring to FIGS. 10A through 10C, the holographic diffractive grating structure 5 may include the first diffractive grating structure 51 and the second diffractive grating structure 52, and the diffractive grating material may include a first layer and a second layer. The first layer and the second layer of the diffractive grating material may be formed by being applied to the single waveguide 6. The first diffractive grating structure 51 and the second diffractive grating structure 52 may be recorded on the first layer and the second layer of the diffractive grating material, respectively. Each of the first diffractive grating structure 51 and the second diffractive grating structure 52 may include an expanding diffractive grating and an out-coupling diffractive grating.

The first layer may be rotated by an angle of $-\alpha$ and the second layer may be rotated by an angle of $+\alpha$, which may be obtained by rotating and assembling the same structure. The periods of all diffractive gratings may be the same. A grating vector $K1_{out}$ (a vector of the first out-coupling diffractive grating), a grating vector $K1_{exp}$ (a vector of the first expanding diffractive grating), a grating vector $K2_{out}$ (a vector of the second out-coupling diffractive grating), and a grating vector $K2_{exp}$ (a vector of the second expanding diffractive grating) may be perpendicular to grating lines in the waveguide plane. The grating vector $K1_{out}$ and the grating vector $K2_{out}$ may have components perpendicular to the first layer and the second layer of the diffractive grating material. The grating vector $K1_{exp}$ and the grating vector $K2_{exp}$ may be parallel to the surfaces of the first layer and the second layer and may not have components perpendicular to the first layer and the second layer. While the holographic diffractive grating structure 5 is described as having two layers according to the current embodiment of the disclosure, it may also have a plurality of layers including three or more layers, without being limited thereto.

Figure 11A:
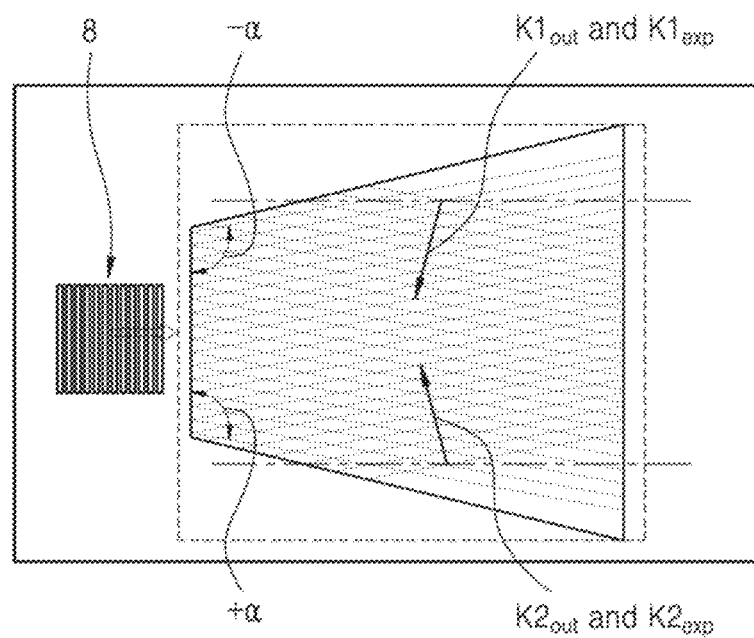
FIG. 11A is a plane view of a single waveguide in which a holographic diffractive grating structure is provided on an upper surface and a lower surface according to an embodiment.
Figure 11B:
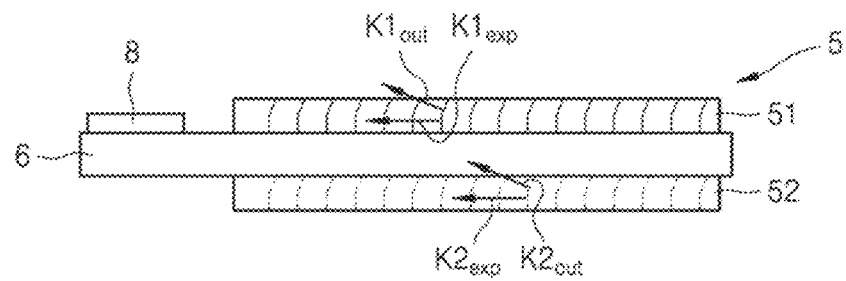
FIG. 11B is a side view of a single waveguide in which the holographic diffractive grating structure of FIG. 11A is provided on an upper surface and a lower surface according to an embodiment.

FIG. 11A is a plan view of the single waveguide 6 where the holographic diffractive grating structures 5 are provided on a top surface and a bottom surface according to an embodiment, and FIG. 11B is a side view of the single waveguide 6 where the holographic diffractive grating structures 5 of FIG. 11A are provided on the top surface and the bottom surface.

Referring to FIGS. 11A and 11B, the holographic diffractive grating structures 5 may include the first diffractive grating structure 51 and the second diffractive grating structure 52, and the diffractive grating material may include a first layer and a second layer. The first layer and the second layer of the diffractive grating material may be provided on the top surface and the bottom surface of the single waveguide 6. The first diffractive grating structure 51 and the second diffractive grating structure 52 may be recorded on the first layer and the second layer of the diffractive grating material, respectively. Each of the first diffractive grating structure 51 and the second diffractive grating structure 52 may include an expanding diffractive grating and an out-coupling diffractive grating. Other matters than the positions of the first layer and the second layer of the diffractive grating material may be substantially the same as the embodiment of the disclosure described with reference to FIGS. 10A through 10C. While the holographic diffractive grating structure 5 is described as having one layer on each of the top surface and the bottom surface of the diffractive grating material according to the current embodiment of the disclosure, it may also have a plurality of layers including two or more layers on each of the top surface and the bottom surface of the diffractive grating material, without being limited thereto.

Figure 12:
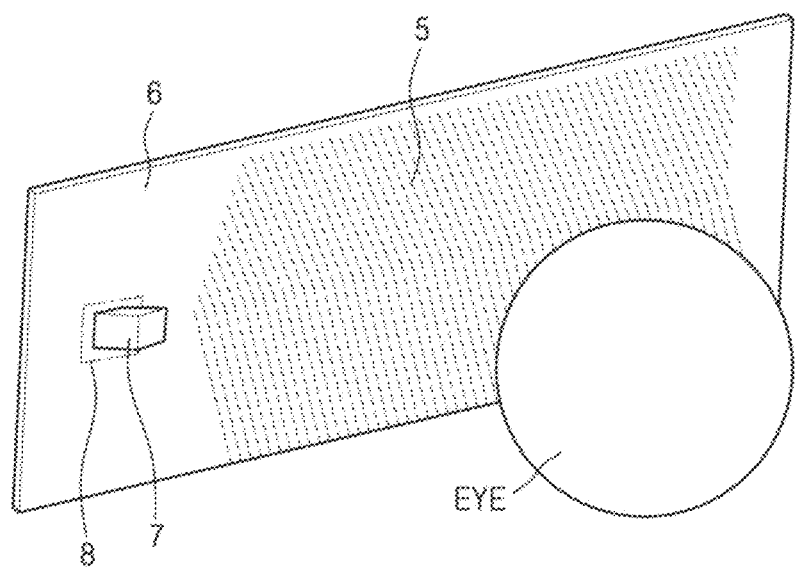
FIG. 12 illustrates an augmented reality (AR) device for displaying AR according to an embodiment.

FIG. 12 illustrates an AR device for displaying AR according to an embodiment.

Referring to FIG. 12, an AR device may include a projection system 7, the input diffraction element 8, the waveguide 6, and the holographic diffractive grating structure 5. The holographic diffractive grating structure 5 may be formed by being recorded on the diffractive grating material, and may include an expanding diffractive grating and an out-coupling diffractive grating. The holographic diffractive grating structure 5 may be any one of the holographic diffractive grating structures 5 according to the above-described embodiments of the disclosure.

The AR device may operate as described below.

Light beams formed by the projection system 7 may reach the input diffractive element 8 located in the waveguide 6. Rays of the "+1" diffraction order formed by being diffracted in the input diffraction element 8 may propagate toward the holographic diffractive grating structure 5 along the waveguide 6 by total internal reflection (TIR). When the rays reach the holographic diffractive grating structure 5, the rays may begin to be diffracted in the expanding diffractive grating of the holographic diffractive grating structure 5 and may be output to an eye of an observer due to diffraction in the out-coupling diffractive grating of the holographic diffractive grating structure.

Figure 13:
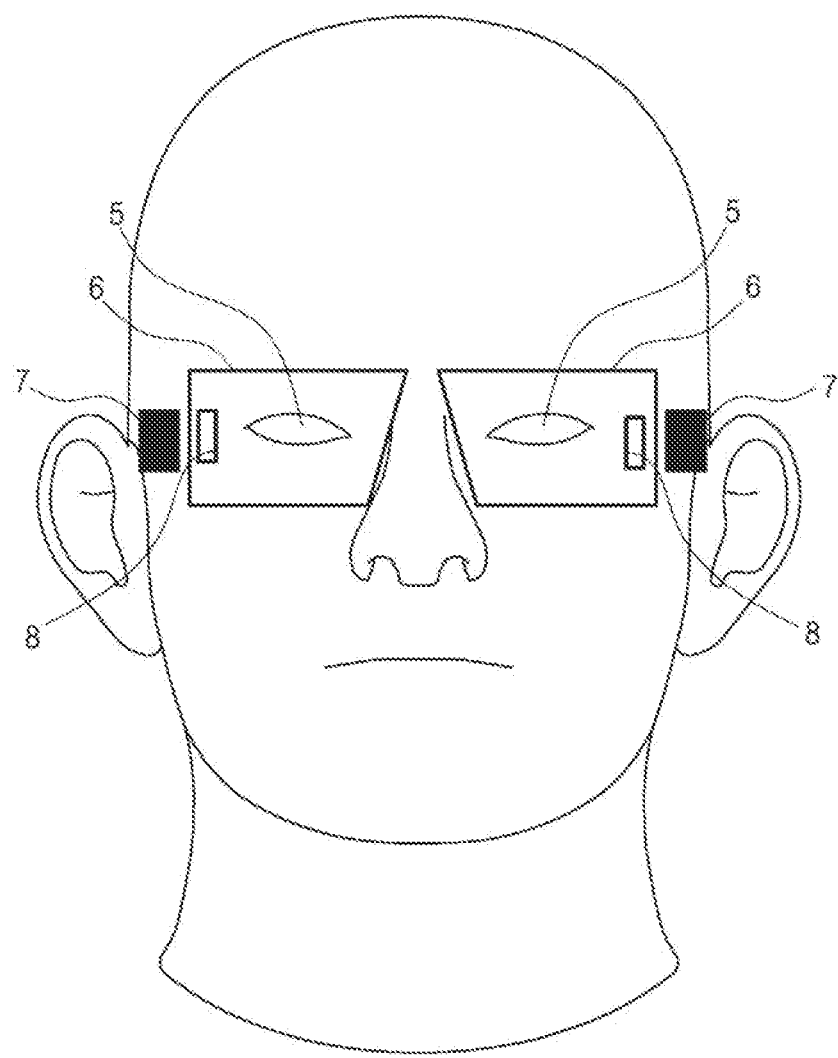
FIG. 13 illustrates AR glasses according to an embodiment.

FIG. 13 illustrates AR glasses according to an embodiment.

Referring to FIG. 13, AR glasses may use the AR device described with reference to FIG. 12, in place of lenses, as a right-eye element and a left-eye element. That is, the AR glasses may include the waveguide 6 and the projection system 7 for each of the left eye and the right eye. Each waveguide 6 may have the holographic diffractive grating structure 5 and may be fixed to a frame. Each projection system 7 may be based on a micro-projector, may be located near the temples of the human head, and may be fixed to the frame of the glasses. Each waveguide 6 may include the input diffraction element 8 for inputting light to the waveguide 6 from the projection system 7. Each waveguide 6 may be placed such that a region with the holographic diffractive grating structure 5 is located opposite to the corresponding eye. The diffractive grating element 5 may be a random holographic diffractive grating structure described in the above-described embodiments of the disclosure. The projection system 7 may be located opposite to the input diffractive element 8.

Information processing and image formation for the projection system 7 may be achieved directly in a computer (e.g., embedded in spectacle temples) of the AR device, or the AR device may be connected to an external electronic device such as a smartphone, a tablet, a computer, a laptop, other all intelligent (smart) devices, etc. Signal transmission between the AR device and the external electronic device may be performed through wired communication and/or wireless communication. The AR device may be supplied with a power source from at least any one of an embedded power source (chargeable battery), an external device, or an external power source.

Figure 14A:
FIG. 14A illustrates an enlarged field of view according to a related example.
Figure 14B:
FIG. 14B illustrates a field of view enlarged using a holographic diffractive grating structure according to an embodiment.

FIG. 14A illustrates a field of view enlarged according to a related art, and FIG. 14B illustrates a field of view enlarged using a holographic diffractive grating structure according to an embodiment.

Referring to FIGS. 14A and 14B, through comparison with a related art, it may be seen how much the field of view may be increased by adopting the waveguide having the holographic diffractive grating structure according to the disclosure. When the waveguide having the diffractive grating structure according to the disclosure is applied to the AR device, the wide field of view may be guaranteed, thereby providing an immersive effect of presence.

High resolution may provide a lifelike presence because the user may see details in a near real world. The waveguide having the holographic diffractive grating structure according to the disclosure may be used in any of an augmented reality/virtual reality (ARNR) device, a head-up display (HUD) device, and a helmet-mounted display (HMD) device, which may need to have a high resolution image and a wide field of view. Also, the waveguide having the holographic diffractive grating structure according to the disclosure be widely used for the manufacturing of transparent demonstration displays.

With the apparatus and method for recording the holographic diffractive grating structure according to the embodiments of the disclosure, the holographic diffractive grating structure capable of providing the wide field of view may be recorded on the single waveguide.

The holographic diffractive grating structure according to the embodiments of the disclosure may be recorded in the single waveguide and provide the wide field of view.

The AR device according to the disclosed embodiments of the disclosure may provide the wide field of view.

The holographic diffractive grating structure and the AR device based on the waveguide with the holographic diffractive grating structure according to the embodiments of the disclosure may be compact and easy to manufacture, thus lowering a manufacturing cost.

While the AR device based on the waveguide with the holographic diffractive grating structure and the apparatus for recording the holographic diffractive grating structure according to the disclosure have been shown and described with reference to the embodiments illustrated in the drawings to help understanding, this is merely an example and those of ordinary skill in the art that would understand that various modifications and equivalent other embodiments of the disclosure may be possible therefrom. Therefore, the technical scope of the disclosure should be defined by the appended claims and their equivalents.

What is claimed is:

1. An apparatus for recording a holographic diffractive grating structure, the apparatus comprising:
   a light source configured to output light;
   a beam splitter configured to split the light output from the light source into a first light beam and a second light beam;
   a first amplitude filter and a first triangular prism that are provided on a path of the first light beam; and
   a second amplitude filter and a second triangular prism that are provided on a path of the second light beam,
   wherein the first amplitude filter is provided such that a first part of the first light beam is directed to the first triangular prism without passing through the first amplitude filter and a second part of the first light beam, which is different from the first part, is directed to the first triangular prism after being attenuated by passing through the first amplitude filter,
   wherein the first triangular prism is provided such that the first part of the first light beam is incident on a first surface of the first triangular prism, which corresponds to one of equal sides of an isosceles triangle, and exits through a first exit surface of the first triangular prism, which corresponds to a base of the isosceles triangle, and the second part of the first light beam is incident on a second surface of the first triangular prism, which corresponds to the other side of the equal sides of the isosceles triangle, and exits through the first exit surface,
   wherein the second triangular prism is provided such that the second light beam is attenuated by passing through the second amplitude filter, is incident on a first surface of the second triangular prism, and exits through a second exit surface of the second triangular prism, the second exit surface of the second triangular prism being separated from and parallel to the first exit surface of the first triangular prism, and
   wherein a diffractive grating material for recording the holographic diffractive grating structure is provided between the first exit surface of the first triangular prism and the second exit surface of the second triangular prism.

2. The apparatus of claim 1, wherein an incident angle at which the first part of the first light beam is incident on the first surface of the first triangular prism and an incident angle at which the second part of the first light beam is incident on the second surface of the first triangular prism are equal.

3. The apparatus of claim 1, further comprising at least one of a first light beam expander provided on a path of the first light beam between the beam splitter and the first amplitude filter, the first light expander being configured to expand a beam width of the first light beam and a second light beam expander provided on a path of the second light beam between the beam splitter and the second amplitude filter, the second light beam expander being configured to expand a beam width of the second light beam.

4. The apparatus of claim 1, further comprising at least one of a first light path conversion member provided on a path of the first light beam between the beam splitter and the first triangular prism, the first light path conversion member being configured to convert the path of the first light beam and a second light conversion member provided on a path of the second light beam between the beam splitter and the second triangular prism, the second light path conversion member being configured to convert the path of the second light beam.

5. The apparatus of claim 1, wherein the light source comprises a coherent light source.

6. The apparatus of claim 1, further comprising:
   a first shutter provided behind the first amplitude filter; and
   a second shutter provided behind the second amplitude filter.

7. The apparatus of claim 1, further comprising a rotation table that is provided between the first exit surface of the first triangular prism and the second exit surface of the second triangular prism that is parallel to the first exit surface of the first triangular prism, the rotation table comprising a top surface on which the diffractive grating material for recording the holographic diffractive grating structure is provided.

8. A method of recording a holographic grating structure by an apparatus configured to record the holographic diffractive grating structure of claim 1, the method comprising:
   generating light by a light source;
   splitting the light into a first light beam and a second light beam by a beam splitter;
   directing a first part of the first light beam to a first surface of a first triangular prism, which corresponds to one of equal sides of an isosceles triangle, without passing through the first amplitude filter;
   attenuating a second part of the first light beam, which is different from the first part, by the first amplitude filter, and directing the second part to a second surface of the first triangular prism, which corresponds to the other of the equal sides of the isosceles triangle;
   directing the first part of the first light beam and the second part of the first light beam to be incident on the first surface and the second surface of the first triangular prism, refracting the first part and the second part, and directing the first part and the second part to exit from a first exit surface of the first triangular prism, which corresponds to a base of the isosceles triangle;
   attenuating the second light beam by the second amplitude filter, directing the second light beam to be incident on a first surface of the second triangular prism, refracting the second light beam, and directing the second light beam to exit through a second exit surface of the second triangular prism;

providing a diffractive grating material for recording the holographic diffractive grating structure between the first exit surface of the first triangular prism and the second exit surface of the second triangular prism;

forming an interference pattern by the first part of the first light beam and the second part of the first light beam based on the first part of the first light beam and the second part of the first light beam being incident on the diffractive grating material through the first exit surface of the first triangular prism and recording a first diffractive grating in the diffractive grating material; and forming an interference pattern by the first part of the first light beam and the second light beam based on the second light beam being incident on the diffractive grating material through the second exit surface of the second triangular prism and recording a second diffractive grating in the diffractive grating material.

9. The method of claim 8, wherein an incident angle at which the first part of the first light beam is incident on the first surface of the first triangular prism and an incident angle at which the second part of the first light beam is incident on the second surface of the first triangular prism are equal, such that a maximum intensity and a minimum intensity of the interference pattern by the first part of the first light beam and the second part of the first light beam are formed vertically in a depth direction on a first surface of the diffractive grating material.

10. The method of claim 9, wherein the maximum intensity and the minimum intensity of the interference pattern by the first part of the first light beam and the second part of the first light beam are formed at an angle to a second surface of the diffractive grating material, which opposes the first surface of the diffractive grating material.

11. The method of claim 8, wherein the first refractive grating comprises an expanded diffractive grating, and the second refractive grating comprises an out-coupling diffractive grating.

12. The method of claim 8, wherein a surface period of the first diffractive grating and a surface period of the second diffractive grating are equal.

13. The method of claim 8, wherein a recording depth of the first diffractive grating and a recording depth of the second diffractive grating correspond to a selection of transmittance of the first amplitude filter and a selection of transmittance the second amplitude filter, respectively.

14. The method of claim 8, wherein a recording depth of the first diffractive grating and a recording depth the second diffractive grating correspond to selection of an exposure time.

15. The method of claim 8, further comprising providing the diffractive grating material on a rotation table,
wherein the recording of the first diffractive grating and the recording of the second diffractive grating comprise:
rotating a rotation table in which the diffractive grating material is placed by an angle of +α, and recording a first diffractive grating structure on the diffractive grating material; and
rotating the rotation table by an angle of −α, and recording a second diffractive grating structure on the diffractive grating material,
wherein the first diffractive grating structure comprises a first expanding diffractive grating and a first out-coupling diffractive grating that are recorded to a certain thickness from a top surface and a bottom surface of the diffractive grating material, respectively, and
wherein the second diffractive grating structure is formed between the first expanding diffractive grating and the first out-coupling diffractive grating.

16. The method of claim 8, wherein the diffractive grating material comprises a first layer and a second layer on a surface of the waveguide,
wherein the first diffractive grating structure and the second diffractive grating structure are formed on the first layer and the second layer of the diffractive grating material, respectively, and
wherein each of the first diffractive grating structure and the second diffractive grating structure comprises the first diffractive grating and the second diffractive grating.

17. The method of claim 16, further comprising rotating the first diffractive grating structure and the second diffractive grating structure at symmetric angles with respect to a vector of the input diffractive element.

18. The method of claim 8, wherein the diffractive grating material comprises a first layer and a second layer provided on a top surface and a bottom surface of the waveguide, respectively, the top surface and the bottom surface opposing each other,
wherein the first diffractive grating structure and the second diffractive grating structure are formed on the first layer and the second layer of the diffractive grating material, respectively, and
wherein each of the first diffractive grating structure and the second diffractive grating structure comprises the first diffractive grating and the second diffractive grating.

19. An augmented reality (AR) device for displaying AR, the AR device comprising:
a projection system;
an input diffractive element; and
a waveguide comprising a holographic diffractive grating structure that comprises an expanded diffractive structure and an out-coupling diffractive grating,
wherein the expanded diffractive grating has a shape of a first interference pattern formed in a depth direction on a first surface of a diffractive grating material applied to the waveguide,
wherein the out-coupling diffractive grating has a shape of a second interference pattern formed in a depth direction on a second surface of the diffractive grating material, the second surface opposing the first surface,
wherein the shape of the first interference pattern is formed such that a maximum intensity and a minimum intensity of the first interference pattern are formed vertically in the depth direction on the first surface of the diffractive grating material, and
wherein the shape of the second interference pattern is formed such that a maximum intensity and a minimum intensity of the second interference pattern are formed at an angle in the depth direction on the second surface of the diffractive grating material, the second surface opposing the first surface.

20. The AR device of claim 19, wherein the expanded diffractive grating comprises a transmissive expanded diffractive grating, and the out-coupling diffractive grating comprises a reflective out-coupling diffractive grating.

21. An apparatus for recording a holographic diffractive grating structure, the apparatus comprising:
- a light source configured to output light;
- a beam splitter configured to split the light into a first light beam and a second light beam;
- a first expander, a first amplitude filter, and a first triangular prism that are provided on a path of the first light beam; and
- a second expander, a second amplitude filter, and a second triangular prism that are provided on a path of the second light beam,
- wherein the first amplitude filter is configured to direct a first part of the first light beam directly to the first triangular prism and direct a second part of the first light beam, which is different from the first part to the first triangular prism after passing through the first amplitude filter,
- wherein the first triangular prism comprises a first surface on which the first part of the first light beam is incident, a second surface on which the second part of the first light beam is incident, and a first exit surface through which the first part of the first light beam and the second part of the first light beam exits,
- wherein the second triangular prism comprises a first surface on which the second light beam that passes the second amplitude filter is incident and a second exit surface through which the second light beam exits,
- wherein the second exit surface of the second triangular prism is spaced apart from and parallel to the first exit surface of the first triangular prism, and
- wherein a diffractive grating material for recording the holographic diffractive grating structure is provided between the first exit surface and the second exit surface.

* * * * *